April 18, 1939.  A. R. THOMPSON  2,154,789
PEAR PREPARATION MACHINE
Filed Dec. 19, 1936  4 Sheets-Sheet 1
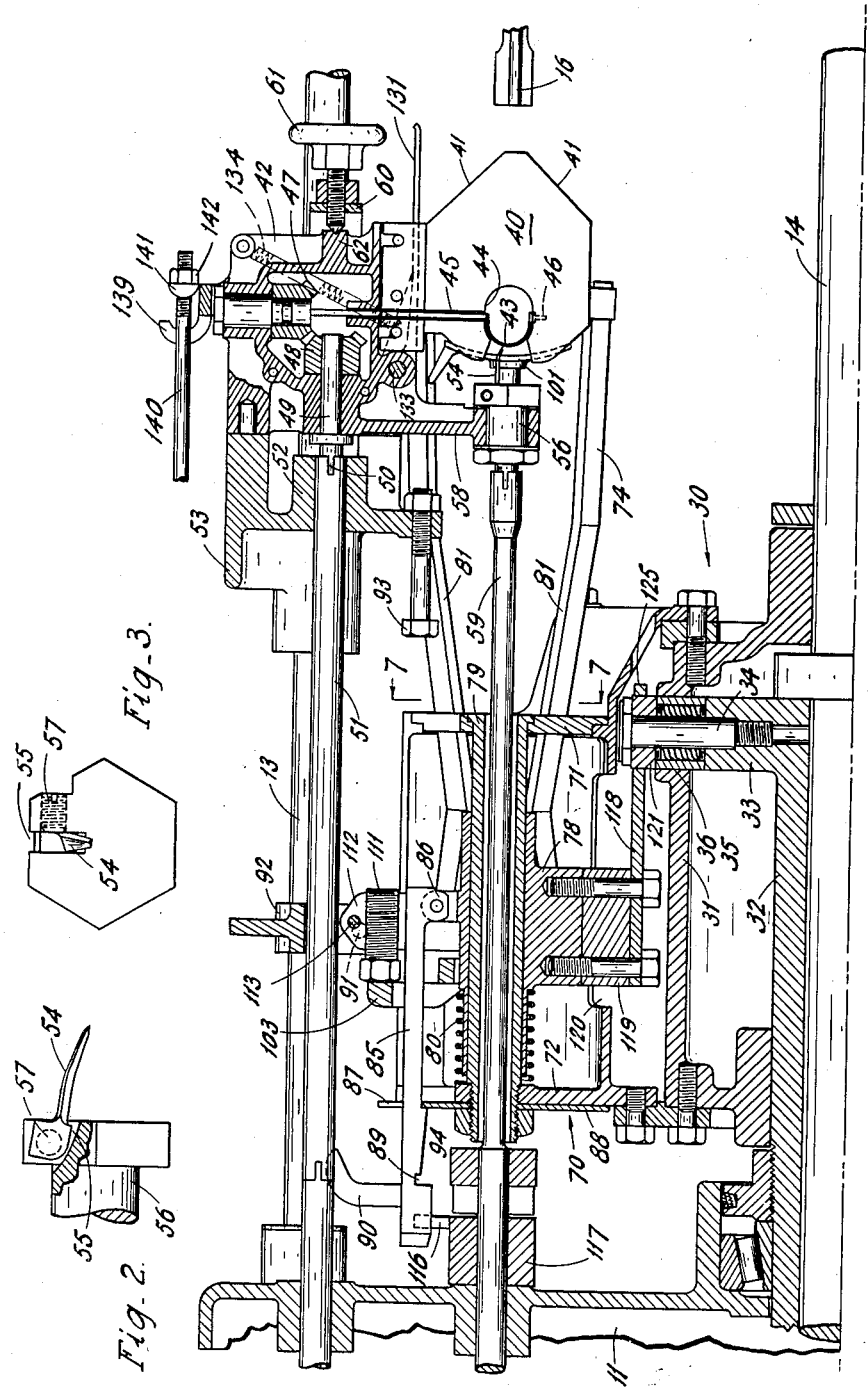
INVENTOR.
Albert R. Thompson.
BY Philip G. Minnis
ATTORNEY.

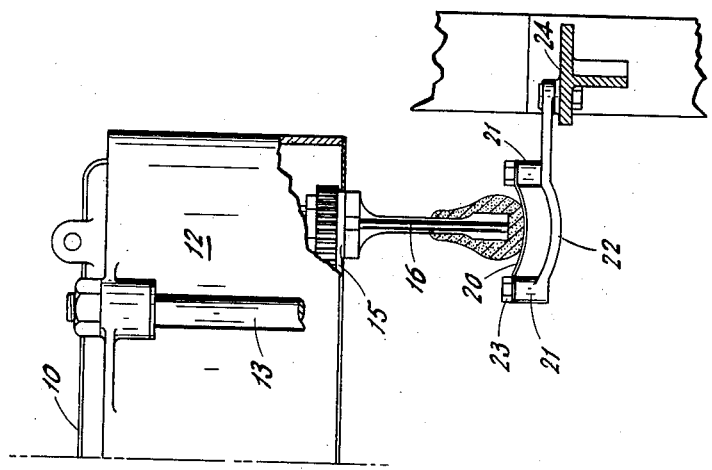
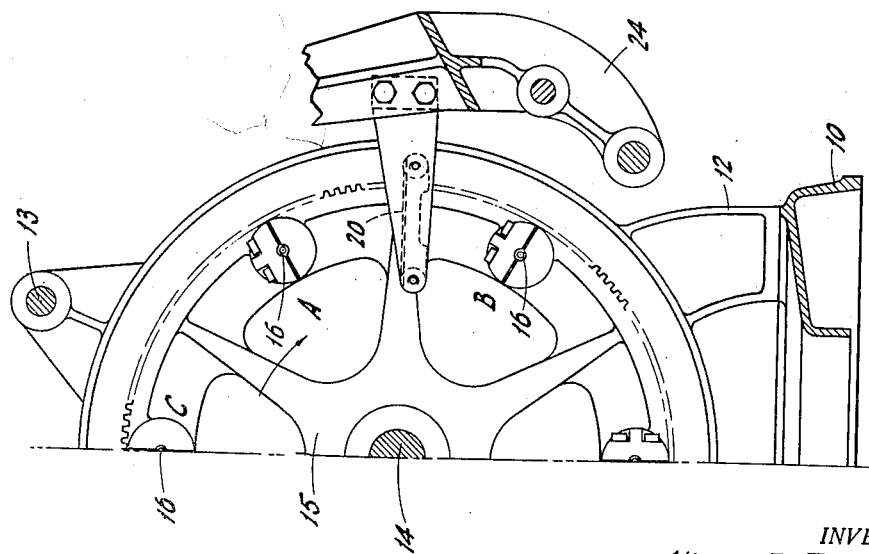

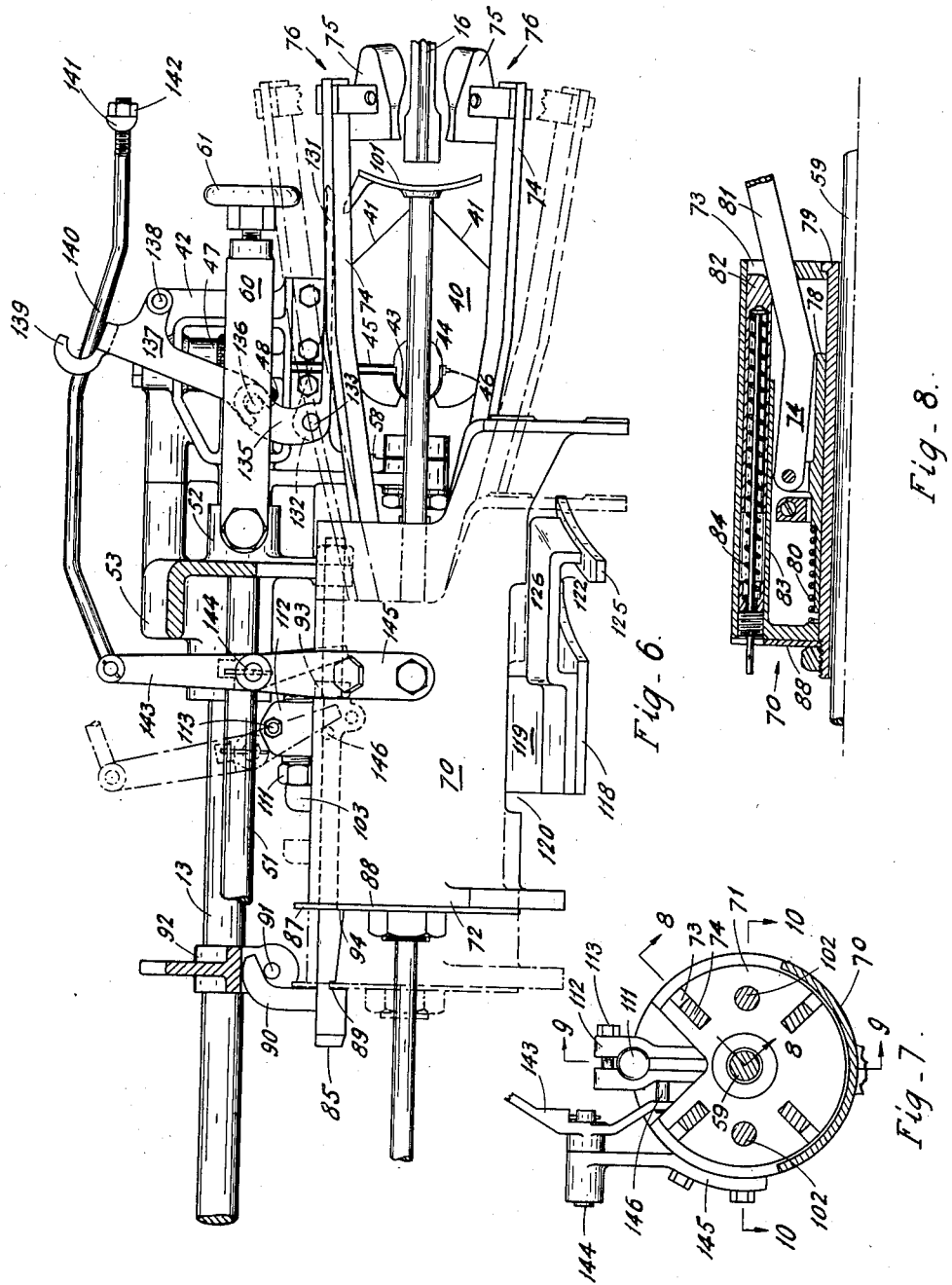

Patented Apr. 18, 1939

2,154,789

UNITED STATES PATENT OFFICE 2,154,789

PEAR PREPARATION MACHINE

Albert R. Thompson, Los Gatos, Calif., assignor to Food Machinery Corporation, San Jose, Calif., a corporation of Delaware Application December 19, 1936, Serial No. 116,785

20 Claims. (Cl. 146—42)

This invention relates to pear preparation machines of the character disclosed, for example, in the co-pending application of myself and William de Back, Serial No. 745,252, filed September 24, 1934, and more particularly to an improved machine in which the coring and trimming operations are performed efficiently by improved and simplified mechanisms.

It is a general object of the invention to provide an improved pear preparation machine.

Another object of the invention is to provide an improved mechanism for positioning the fruit during the coring operation, which can be easily adjusted to vary the positioning for different sizes and varieties of pears.

Another object of the invention is to provide improved means for trimming and forming the calyx ends of the pears.

Another object of the invention is to provide simple and positive means for removing the fruit from the splitting blade after the splitting, coring, and trimming operations.

Other objects will appear from the following description of a preferred embodiment of the invention, as described in connection with the drawings, in which:

Fig. 1 is a fragmentary vertical sectional view of the upper part of the machine, the view being taken through the longitudinal center line of the machine.

Fig. 2 is an enlarged side elevation of the knife for cutting out the calyx of the fruit.

Fig. 3 is a front elevation of the calyx knife.

Fig. 4 is a fragmentary sectional elevation of the revolving turret which carries the fruit past various processing devices.

Fig. 5 is a fragmentary plan view illustrating the relation between the butt trimming knife and a piece of fruit carried by the turret.

Fig. 6 is a fragmentary sectional elevation of the splitting, coring and trimming mechanism, together with the transfer mechanism for carrying fruit into operative relation thereto, which is shown in position to grasp a pear presented thereto by a stemming tube.

Fig. 7 is a fragmentary sectional elevation of a part of the transfer mechanism, and is indicated by the line 7—7 in Fig. 1.

Fig. 8 is a fragmentary sectional view of a part of the transfer mechanism and is taken in the plane of the line 8—8 in Fig. 7.

Figure 9:
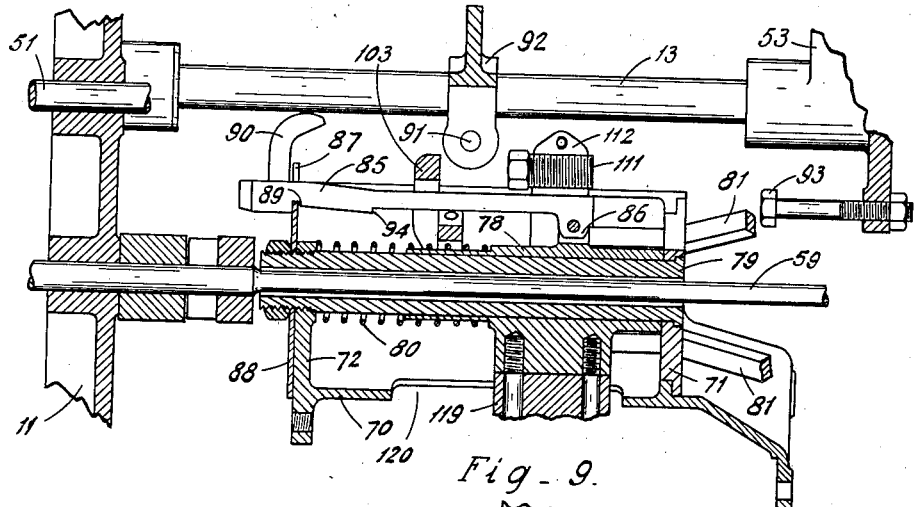
Fig. 9 is a fragmentary sectional view similar to Fig. 1, but showing a different relative position of the parts. The plane of the view is indicated by the line 9—9 in Fig. 7.

Generally, the machine includes a revolving carrier or turret having a plurality of fruit supporting devices to which the fruit is fed to be carried past the various processing means. The turret preferably has an intermittent rotary motion, and associated therewith is a reciprocatory carriage which is moved back and forth during each period of rest of the turret. Consequently, a pear supported on one of the fruit supporting devices is presented successively to the various processing devices, such as the peeling mechanism (not shown) which may be carried by the reciprocatory carriage, until it has been completely peeled, cored, trimmed and split in half, after which it is ejected from the machine. Only so much of the machine as is believed desirable to an understanding of the instant invention will be described, and, if a description of the other operative mechanisms is desired, such may be had by reference to the above noted application, Serial No. 745,252.

The machine includes a frame made up of a base 10 (Figs. 1 and 4) on which a pair of end standards 11 and 12 are mounted in spaced relation, such standards being connected by parallel tie rods 13. The standards 11 and 12 have journalled therein a main shaft 14, which at one end carries the turret 15 on which a plurality of fruit supporting devices, in the form of stemming tubes 16, are mounted. The shaft 14 may be driven intermittently from a suitable source of power so that the stemming tubes are moved successively from the position where fruit is placed thereon, through a series of peeling stations into a position in alignment with the splitting, coring, and calyx trimming unit.

The position for feeding fruit on the stemming tubes is indicated at A in Fig. 4, where the pears are impaled in centered position, stem end first, on the stemming tubes, either manually or by feeding mechanism such as disclosed in said application Serial No. 745,252, as each stemming tube is at rest in this position. Preferably, the impaling should be effected so that the butt or calyx end of each pear projects substantially the same distance beyond the end of the associated stemming tube for a purpose about to be described.

As the impaled pear is carried by a stemming tube from the feeding position A to the next position B, where a peeling operation may be performed, the butt end is cut off by a trimming knife mounted in spaced relation from the turret. As seen in Figs. 4 and 5, a trimming knife 20 is mounted between the spaced bosses 21 of a mounting bracket 22 as by cap screws 23, the bracket 22 being secured by suitable fastening means on an upright bracket 24, which may be suitably supported on the frame. As seen most clearly in Fig. 4, the trimming knife is preferably mounted at a right angle to the path of travel of the pear, and extends substantially radially of the turret.

While the trimming knife may be straight, it is preferred to provide a slight curvature therein as shown, to conform generally to the curvature of the butt end of the fruit. Thus, the butt end of the pear is cut with a cylindrical rather than a flat contour, which results not only in saving more of the meat of the pear, but also in a more attractive contour, as explained in greater detail in connection with the splitting operation.

After passing the trimming knife, a pear passes successively to various peeling stations, and then to the transfer position, indicated at C in Fig. 4, where it is removed from the stemming tube and presented to the splitting, coring, and trimming unit. As stated previously, the operation of the peeling mechanisms and the transfer mechanism is effected by means of a reciprocatory carriage which is moved back and forth during each rest period of the turret.

The reciprocatory carriage is indicated generally at 30 in Fig. 1, and may comprise a cam cylinder 31 which is slidably journalled on the main shaft 14 and on a sleeve 32 suitably journalled about the main shaft. The sleeve 32 is driven continuously from the source of power in a timed relation to the intermittent rotary movements of the main shaft and the turret, and has an arm 33 carrying a stud 34 about which a roller 35 is journalled. The roller engages a suitably formed cam groove 36 in the cam cylinder and operates during each rotation of the sleeve, by virtue of the cam groove contour, to reciprocate the carriage during each rest period of the turret. In Fig. 1, the carriage is shown in its farthest left, or retracted position, which it occupies during movement of the turret.

*The splitting, coring, and calyx trimming mechanism*

As previously stated, after being acted upon by the last peeling unit, the next movement of the turret brings the stemming tubes into alignment with a splitting, coring and trimming unit, to which the pears are transferred from the stemming tubes by means of a transfer mechanism presently to be described.

As seen in Figs. 1 and 6, the splitting, coring and trimming unit comprises a splitting blade 40 having knife-like forward edges 41 and secured to the underside of a gear housing 42 in position for axial alignment with one of the stemming tubes 16 during each rest period of the turret 15. An arcuate coring knife 43 is rotatably mounted in an opening 44 in the body of the splitting blade, which latter is also slotted as at 45 for the reception of the shank of the knife. The coring knife is provided with a pivot pin 46 journalled in the splitting blade, and is driven by a bevel gear 47 journalled in the gear housing 42.

The bevel gear 47 on the shank of the coring knife is driven by a second bevel gear 48 intermeshing therewith and secured to a stub shaft 49 journalled in the gear housing 42. The stub shaft has a key 50 on its outer end for driving engagement with a corresponding slot cut in the end of a countershaft 51, which is journalled near one end in the end standard 11 and at the other end in a bearing 52 carried by a bridge 53 which is rigidly secured to the tie rods 13.

A calyx trimming knife 54 (Figs. 1, 2, and 3) is adjustably mounted in a radial slot 55 in the enlarged end of a stub shaft 56 by means of a set screw 57. The knife 54 extends within the split rear edge of the splitting blade closely adjacent the coring knife for operative engagement within the butt ends of the pears as they are positioned on the splitting blade in coring position, and operates to cut out and form the opening at the calyx of the pears during the coring operation. The size of the calyx aperture cut by the knife 54 can be controlled by adjusting the knife in the slot 55. The stub shaft 56 is journalled in a bracket 58 depending from the gear housing 42 and also carries a key on its outer end for driving engagement with a corresponding slot cut in the end of a second countershaft 59 journalled in the end standard 11.

The purpose of the key and slot driving relation between the respective countershafts 51 and 59 and the stub shafts 49 and 56 is to permit disengagement thereof should it be desired to remove the coring and splitting unit for replacement with a substitute unit as, for example, in the event of a broken coring knife. The coring and splitting unit is removably mounted in operative position by means of a yoke 60 pivoted at its ends to the bridge 53 and carrying a hand screw 61 engageable with a countersunk boss 62 on the gear housing 42. It will be apparent that by loosening the hand screw 61 and lifting the yoke 60 the coring and splitting unit is thereupon free for removal.

*The transfer mechanism*

The transfer mechanism provided for removing the pears from the stemming tubes and presenting them to the splitting, coring and trimming unit (see Figs. 1 and 6) includes a cylindrical clamp housing 70 secured to the top of the cam cylinder 36 for reciprocation therewith and provided with front and rear end closures 71 and 72, respectively. The front end closure 71 is provided with radial slots 73 (Fig. 7) which act as guides for four clamp arms 74 projecting therethrough and carrying concave clamp blocks 75 pivoted to their outer ends as at 76. The inner ends of the clamp arms 74 are pivotally secured to bifurcated ears 77 projecting radially from a sleeve block 78 which is slidably journalled on a tube 79 extending axially of the housing 70 about the countershaft 59 which extends freely therethrough. A coil spring 80 may be provided to surround the tube 79 between end closure 72 and the sleeve block 78 and normally urge the latter toward the forward end of the housing 70, as shown in Fig. 9. However, as later described, the sleeve block 78 is moved positively between its two positions, so that the spring 80 may be omitted, although it is considered desirable to assist in the control of the sleeve block.

Figure 11:
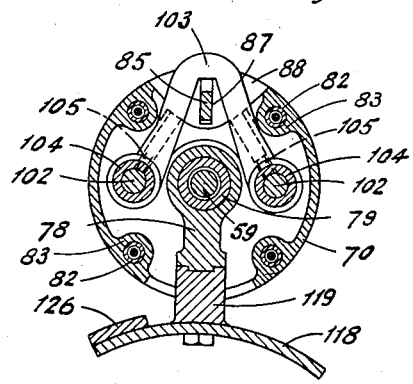
Fig. 11 is a vertical transverse sectional view of the transfer mechanism taken in the plane of the line 11—11 in Fig. 10.
Figure 12:
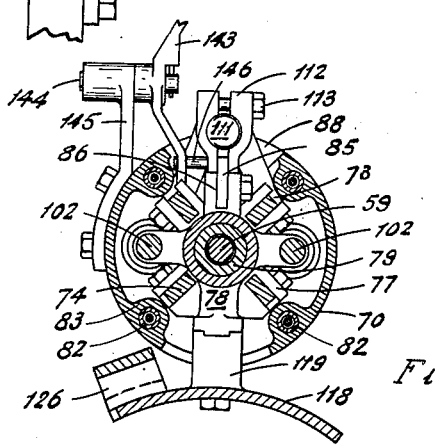
Fig. 12 is a vertical transverse sectional view of the transfer mechanism taken in the plane of the line 12—12 in Fig. 10.

The clamp arms 74 are preferably provided with angular sections 81 which, as they are drawn inwardly and outwardly through the guide slots 73 by movement of the sleeve block 78, draw together or separate the clamp blocks 75 accordingly. Four locking plungers 82 (Figs. 8, 11 and 12) corresponding to the four clamp arms, are slidably mounted in guides 83 formed on the inner surfaces of the housing 70. Each locking plunger is mounted to bear against one of the clamp arms, and the several plungers are held outwardly in engagement with the clamp arms by means of coil springs 84.

The position of the sleeve block 78 relative to the clamp housing to maintain the clamp arms open is positively maintained by latch means during advance of the clamps to engage a pear. For this purpose, a latch arm 85 is pivoted to the sleeve block 78 at 86, and extends rearwardly through a slot 87 of a plate 88 secured to the end closure 72 of the clamp housing. With the sleeve block 78 positioned forwardly of the clamp housing as illustrated in Fig. 9, the latch arm 85 is provided with a notch 89 adapted for engagement with the lower edge of the slot 87 to latch the sleeve block in its forward position, and thereby to latch the clamp arms in open position.

As the clamp arms are carried toward the turret 15 on each forward movement of the cam cylinder 31 and the clamp housing 70, they are held in separated position by the latch arm 85 until just prior to the end of their forward stroke, when the clamp blocks arrive in operative position with respect to a pear presented thereto by one of the stemming tubes. At this point, a cam extension 90 at the rear end of the latch 85 engages a laterally extending pin 91 mounted on a yoke 92 extending between the tie rods 13, to lift latching notch 89 out of engagement with the plate 88 and disconnect the sleeve block from the clamp housing. This occurs just before the forward end of the latch arm 85 comes into engagement with a stop pin 93 projecting rearwardly from the bridge 53 and arrests further travel of the sleeve block and clamp arms secured thereto, as shown in Fig. 6, when the clamp housing is in its dotted line position and the clamp arms are open. During the remainder of the forward movement of the clamp housing 70 to its full line position in Fig. 6, the slots 73 and plungers 82 (Fig. 8) cause the clamp arms 74 to be drawn together to their full line position in Fig. 6, and a shoulder 94 of the latch arm 85 drops behind the lower edge of the slot 87 of the plate 88 secured to the end closure 72 of the clamp housing through which slot the latch arm projects. Also, during such forward travel of the clamp housing 70 after movement of the sleeve block 78 is arrested by stop pin 93, spring 80 is compressed and retained in this condition by the latch arm 85. The clamp arms are thereby locked in contracted position, and spring 80 in compressed condition, until such time as the latch arm is tripped by mechanism presently to be described.

The drawing together of the clamp arms causes them to swing toward a common center, but it will be observed that as each clamp block comes to bear against a pear, the resistance of the fruit against further inward movement of the corresponding clamp arm causes the spring 84 of the associated locking plunger 82 to yield, so that further inward movement is prevented. At the same time it will be obvious that the action of the locking plungers prevents separation of the clamps. Thus the several clamp arms are individually urged inwardly only just far enough so that each clamp block firmly engages the pear and no farther, and the several clamp arms are individually self-locking after further inward movement is arrested. Thus they are enabled to firmly clasp and hold a pear irrespective of its contour without danger of crushing or mutilating it.

Figure 10:
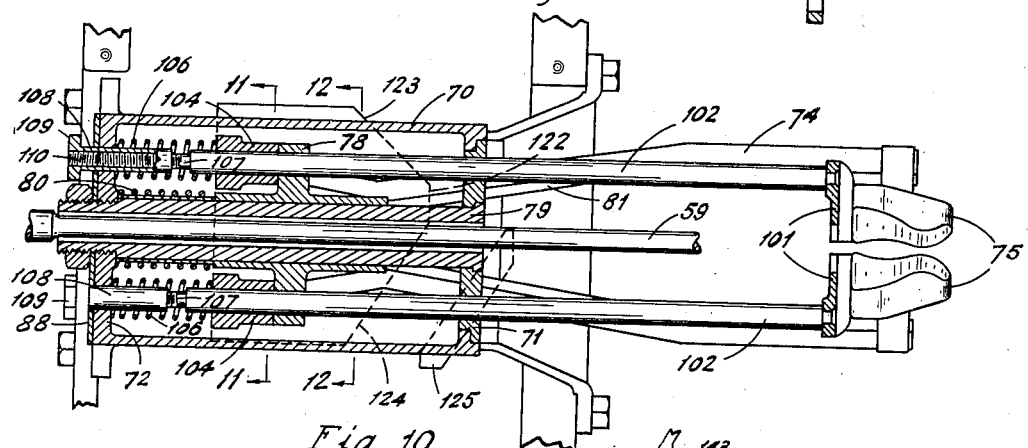
Fig. 10 is a horizontal sectional view taken through the transfer mechanism in the plane of the line 10—10 in Fig. 7.

In order to prevent the possibility of the pear squeezing rearwardly out of the clamp blocks 75 and to positively position the butt end of the pear relative to the coring knife, a pair of concave butt engaging stop plates 101 (Figs. 1, 6 and 10) are provided which are mounted a short distance behind the clamp blocks on the forward ends of a pair of rods 102 slidably mounted in the end closures of the clamp housing. The rods are interconnected for simultaneous actuation by a U-shaped yoke 103 (Fig. 11) the ends of which are provided with bearings 104 secured to the rods by set screws 105. Coil springs 106 (Fig. 10) surround the rods 102 and bear against the yoke bearings 104 so as normally to urge the latter into engagement with the sleeve block 78, which acts as a stop therefor. Adjustment of the rods to vary the position of the stop plates 101 is provided for by turning down the rear ends of the rods as at 107 and threading them into sleeves 108 having bolt heads 109, which cooperate with the plate 88 to limit forward movement of the rods. Threaded locking plugs 110 may be screwed into the sleeves 108, thus locking them in position on the rods 102.

In operation, as the separated clamp arms 74 are carried forwardly from the position shown in Fig. 9 toward a stemming tube 16, the stop plates 101 are held in their extreme forward position by the springs 106 until the end of their forward travel, when the yoke 103 (Fig. 6) engages a stop in the form of a cap screw 111 projecting rearwardly from and adjustably threaded in a split boss 112 of the sleeve block 78 and clamped therein by a bolt 113. The adjustment of the stop 111 is such that the yoke 103 engages therewith a short time after the latch arm 85 engages the stop pin 93 and just before the clamp housing reaches the end of its forward travel, that is, the yoke 103 travels from its dotted line position in Fig. 6 to its full line position, which it reaches when the clamp housing has travelled from the position shown in Fig. 9 to its dotted position in Fig. 6, and before its full line latched position is reached.

The forward travel of the clamp housing, after the yoke 103 engages its stop 111, places springs 106 under compression so that the stop plates are held yieldably in the position determined by the stop 111. As the clamp arms 74 are being drawn together to clamp the pear therebetween, the stop plates 101 are held stationary just behind the butt end of the pear and prevent it from squeezing rearwardly out of the clamp blocks. It is to be noted that the stop 111 for the stop plates is carried by the sleeve block 78 which controls the movement of the clamp arms, so that relative adjustment between the stop plates and the clamp arm can be effected in a very simple and convenient manner.

Throughout the rearward stroke of the cam cylinder the clamp arms 74 are held in contracted position by the latch 85, which remains set during this time so that the pear is firmly carried onto the splitting blade 40 into operative relation with the coring and calyx trimming knives.

It is to be noted that cylindrical surface formed on the butt end of the pear by knife 20 (Figs. 4 and 5) will be turned 270° in travelling from the knife to position C opposite the splitting blade, so that the axis of the curvature is at right angles to the splitting, stop plates 101 having a substantially cylindrical concavity to fit the contour of the butt ends of the pears. In this manner, the pear is split so that outline of the split pear surface includes the curved contour placed on the pear by the knife 20.

When the cam cylinder comes to rest in its retracted position the coring and trimming knives are each given a single revolution by their respective drive shafts 51 and 59, whereby to core and trim the fruit being held in operative relation thereto by the clamp arms. The timing of the operation of the coring and trimming knives preferably is such that the coring and trimming operations are completed a short interval before the cam cylinder starts on its next forward movement. Simultaneously with the completion of these operations, the latch arm 85 is tripped so as to release the slide block 78 for forward movement to open the clamp arms and release the fruit held thereby. Tripping of the latch arm is accomplished by means of a pawl 116 (Fig. 1) which projects from a collar 117 secured to the shaft 59. The pawl is positioned for operative engagement with the latch arm immediately prior to the end of each revolution of the shaft 59 so that the latch is tripped just as the coring and trimming operations are completed.

To control the movement of the sleeve block 78 after it is delatched and to effect separation of the clamp arms upon the release of the latch 85, a cam plate 118 is mounted on a spacer block 119 secured to the under side of the sleeve block 78 and projects through a slot 120 in the under side of the clamp housing 70 for cooperation with a cam roller 121 carried by arm 33 of the rotating sleeve 32. The forward edge of the cam plate 118 has a central short section 122 (Fig. 10) which lies parallel with the adjacent section of the cam cylinder slot 36, and a pair of longer angular sections 123 and 124 which recede from said slot. Opposite the section 124, a cam section 125 is supported in spaced parallel relation by a bracket 126 welded thereto and to the cam plate 118.

When the sleeve block 78 is held in retracted position by the latch 85, the extreme forward edge of the cam plate 118 is held just slightly behind the rear edge of the slot 36 in the cam cylinder so that the cam roller 121 can pass in front of it. The position of the cam plate and the timing of the driving mechanism is such that the cam roller 121 comes opposite the cam edge 122 just as the pawl 116 trips the latch 85, so that as the sleeve block 78 is released, the engagement of the cam 118 with the cam roller 121 permits the sleeve block to advance only just far enough to cause the shoulder 94 of the latch arm 85 to override the edge of the slot 87. Then, as the cam roller 121 continues to advance, the angular edge 124 of the cam plate and cam section 125 advance the sleeve block 78 more or less gradually, the movement being aided and smoothened by the action of the spring 80. In this manner, the sleeve block 78 is returned to the position shown in Fig. 9, where the notch 89 of the latch arm 85 becomes effective. During such return movement of the sleeve block 78, the clamp arms are gently opened to release the fruit held by them.

The return movement of the sleeve block 78 relative to the clamp housing to open the clamp arms and release the fruit, is utilized to operate stripper means for positively removing the pear halves from the splitting blade, which provides against the possibility of such halves sticking to the blades and in being delivered to the ejecting mechanism as disclosed in said application.

The stripper mechanism referred to above comprises a pair of similar stripper arms 131 (Figs. 1 and 6) having similar hubs 132 secured at the ends of a pin 133 pivotally mounted in the gear housing 42. The stripper arms 131 extend along either side of the splitting blade 40 and are normally maintained thereabove by a spring 134 tensioned between the arms and the gear housing 42. Extending upwardly from the stripper arm hub 132 is an arm 135 carrying a pin 136 which is engaged by the bifurcated lower end of a bell crank lever 137 pivoted at 138 on the gear housing 42. The upper end of the bell crank 137 is provided with spaced apart claws 139 through which an operating rod 140 extends. At its forward end the rod 140 has an abutment 141 threaded thereon and locked in adjusted position by a nut 142. The abutment 141 has its rear face contoured to engage within the claws 139 when the clamp housing 70 is moved to its rearward position as illustrated in Fig. 1. This is effected by the connection of the rear end of the rod 140 to a substantially upright operating lever 143 which is pivotally mounted at 144 on a bracket 145 (Figs. 6 and 12) suitably secured on the clamp housing 70. As shown in the dotted line position of the lever 143 in Fig. 6 when the clamp housing 70 is in its rearward position, the lower arm of the lever 143 lies in the path of a pin 146 extending outwardly from the side of the boss 112 on sleeve block 78.

It will be recalled that the opening of the clamp arms is effected by the forward movement of the sleeve block 78, and during such forward movement, the pin 146 rocks the lever 143 to pull the rod 140 rearwardly. As the abutment 141 is at this time operatively engaged with the claws 139, such rearward movement of the rod 140 rocks the bell crank 137, which in turn moves the stripper arms 131 downwardly across the splitting blade against the tension of the spring 134. Thus, if either or both of the pear halves should stick to the splitting blade they will be positively removed from the same and discharged downwardly between the clamp arms to any suitable form of discharge mechanism.

Although the particular embodiment of the invention as described is primarily designed for operating on pears, the invention is not necessarily confined thereto, but may be used either in its entirety or in part, with or without modification, on other fruits as well, without departing from the spirit of the invention. Therefore, I deem myself entitled to all such uses, modifications, or variations as fall within the spirit and scope of the appended claims.

Having now described my invention and in what manner the same may be used, what I claim and desire to protect by Letters Patent is:

1. In a pear preparation machine, a fruit support, a coring device, reciprocable clamp means for transferring fruit from said support into operative relation with said coring device, means mounting said clamp means for movement between respective cooperative positions relative to said fruit support and said coring device, fruit positioning means associated with said clamp means for engaging an end of fruit clamped thereby to position the fruit relative to said clamp means, and an adjustable stop mounted for movement with said clamp means and cooperable with said positioning means for determining the adjusted position of said positioning means relative to said clamp means, whereby to select the desired positioning of fruit with respect to said coring device when presented thereto by said clamp and positioning means.

2. In a pear preparation machine, a fruit support, a coring device, reciprocable clamp means for transferring fruit from said support into operative relation with said coring device, means mounting said clamp means for movement through a predetermined length of travel back and forth between its respective cooperative positions relative to said fruit support and said coring device, fruit positioning means cooperable with said clamp means and having reciprocatory movement relative thereto for engaging an end of fruit clamped thereby, and an adjustable stop mounted for cooperation with said clamp means for varying the limits of the reciprocatory movement of said positioning means relative to said clamp means.

3. In a pear preparation machine, a fruit support, a coring device, reciprocable clamp means for transferring fruit from said support into operative relation with said coring device, means mounting said clamp means for movement between respective cooperative positions relative to said fruit support and said coring device, reciprocable fruit positioning means cooperable with said clamp means for engaging an end of fruit clamped thereby, an adjustable stationary stop for limiting the travel of said clamp means toward said fruit support, and adjustable stop means carried by said clamp means for varying the limits of the reciprocatory movement of said positioning means.

4. In a pear preparation machine having a fruit coring device and a device for engaging the calyx end of the fruit to position the fruit relative to the coring device, the combination of a movable fruit support for receiving fruit with the butt end positioned outwardly thereof and for presenting fruit to the positioning and coring devices butt end first, and a knife mounted adjacent the path of movement of said fruit support to trim the butt end of a piece of fruit as it is carried along said path by said fruit support.

5. In a pear preparation machine, a splitting blade for dividing a pear into halves, a fruit support for receiving pears stem end first with the butt end positioned outwardly thereof, said support being mounted for movement from said fruit receiving position along a path to present pears butt end first to said splitting blade, and an arcuate butt trimming knife mounted to cut off the butt end of a pear carried by said fruit support and provide a substantially cylindrical contoured surface on the butt end of the pear, said support presenting a pear to said splitting blade with the axis of said cylindrical surface at a right angle to the plane of the splitting blade.

6. In a pear preparation machine, a splitting blade for dividing a pear into halves, a coring knife mounted within an aperture of said blade, a calyx trimming knife extending into a recess of said blade, a stripper for removing pear halves from said blade, a fruit support for receiving pears stem end first with the butt end positioned outwardly thereof, said support being mounted for movement to present pears butt end first to said splitting blade, a butt trimming knife for severing the butt end of a pear during movement of said support to present the pear to said splitting blade, and means for transferring pears from said fruit support onto said splitting blade into operative relation with said coring and calyx trimming knives including pear positioning means for engaging the butt end of a pear engaged with said transferring means.

7. In a pear preparation machine, a splitting blade for dividing a pear into halves, a coring knife mounted within an aperture of said blade, a calyx trimming knife extending into a recess of said blade, a fruit support for receiving pears stem end first with the butt end positioned outwardly thereof, said support being mounted for movement to present pears butt end first to said splitting blade, a butt trimming knife for severing the butt end of a pear during movement of said support to present the pear to said splitting blade, means for transferring pears from said fruit support onto said splitting blade into operative relation with said coring and calyx trimming knives including clamp means for engaging about a pear and pear positioning means for engaging the butt end of a pear engaged with said clamp means, a stripper for removing pear halves from said splitting blade, means for opening said clamp means after operation of said coring and calyx trimming knives, and means controlled by said clamp opening means for operating said stripper.

8. In a pear preparation machine, a splitting blade for dividing a pear into halves, a coring knife mounted within an aperture of said blade, a calyx trimming knife extending into a recess of said blade, a stripper for removing pear halves from said blade, a fruit support for receiving pears stem end first with the butt end positioned outwardly thereof, said support being mounted for movement to present pears butt end first to said splitting blade, a butt trimming knife for severing the butt end of a pear during movement of said support to present the pear to said splitting blade, reciprocable means for transferring pears from said fruit support onto said splitting blade into operative relation with said coring and calyx trimming knives including clamp means for engaging about a pear and pear positioning means for engaging the butt end of a pear engaged by said clamp means, said transferring means including an adjustable stop carried by said clamp means for determining the adjusted position of said positioning means.

9. In a fruit preparation machine, a splitting blade, clamp means for supporting and moving a piece of fruit onto the splitting blade, a stripper mounted for movement relative to said splitting blade and having spaced apart portions for removing split sections of fruit from each side of the splitting blade, means for opening said clamp means, and means controlled by said clamp opening means for actuating said stripper.

10. In a fruit preparation machine, a splitting blade, a coring knife mounted in the plane of said splitting blade, clamp means for supporting and moving a piece of fruit onto the splitting blade into operative relation with said coring knife, means for operating said coring knife, a stripper for removing split sections of fruit from the splitting blade, means for opening said clamp means after operation of said coring knife, and means operated by operation of said clamp opening means for actuating said stripper.

11. In a pear preparation machine, the combination with a splitting blade, and a coring knife mounted in an apertured portion of the blade, of a trimming knife extending into said apertured portion and having its end positioned closely adjacent said coring knife, and means mounting said trimming knife for adjustment in a plane containing its axis of rotation to vary the radial positioning of said trimming knife relative to said axis.

12. In a pear preparation machine, the combination with a splitting blade, and a coring knife mounted in an apertured portion of the blade, of a shaft having its axis lying substantially in the plane of said blade and having a radial slot formed therein, of a trimming knife mounted for adjustment in said slot and extending into said apertured blade portion.

13. In a pear preparation machine, a splitting blade for dividing a pear into halves, a rotary turret, a fruit support mounted on said turret in parallel relation with the axis thereof for receiving pears stem end first with the butt end positioned outwardly thereof, means for operating said turret to move said fruit support from pear receiving position into alignment with said splitting blade to present pears thereto butt end first, and an arcuate butt trimming knife mounted adjacent the path of movement of said support to cut off the butt end of a pear carried thereby and provide a substantially cylindrical contoured surface on the butt end of the pear, the location of said knife relative to said path of movement and to said splitting blade being such that said support presents a pear to said splitting blade with the axis of said cylindrical surface at a right angle to the plane of the splitting blade.

14. In a pear preparation machine, a splitting blade for dividing a pear into halves, a rotary turret, a fruit support mounted on said turret in parallel relation with the axis thereof for receiving pears stem end first with the butt end positioned outwardly thereof, means for operating said turret to move said fruit support from pear receiving position into alignment with said splitting blade to present pears thereto butt end first, and an arcuate butt trimming knife mounted adjacent the path of movement of said support and disposed substantially radially with respect to said turret to cut off the butt end of a pear carried by said support and provide a substantially cylindrical contoured surface on the butt end of the pear, the location of said knife relative to said path of movement and to said splitting blade being such that said support presents a pear to said splitting blade with the axis of said cylindrical surface at a right angle to the plane of the splitting blade.

15. In a pear preparation machine, a rotary turret, a splitting blade mounted in said machine with the plane thereof intersecting the axis of said turret, a fruit support carried by said turret in parallel relation to the axis thereof for receiving pears stem end first with the butt end positioned outwardly, means for operating said turret to move said fruit support from pear receiving position into alignment with said splitting blade to present pears thereto butt end first, and an arcuate butt trimming knife mounted adjacent the path of movement of said support and disposed substantially radially with respect to said turret to cut off the butt end of a pear carried by said support and provide a substantially cylindrical contoured surface on the butt end of the pear.

16. In a pear preparation machine, a splitting blade for dividing a pear into halves, a fruit support for receiving pears stem end first with the butt end positioned outwardly thereof, means for moving said support from a pear receiving position to a position aligned with said splitting blade to present a pear thereto, and an arcuate butt trimming knife mounted adjacent the path of movement of said support to cut off the butt end of a pear carried thereby and provide a substantially cylindrical contoured surface on the butt end of the pear, said blade and said knife lying in respective planes intersected by said path of movement substantially at right angles whereby said support presents a pear to said splitting blade with the axis of said cylindrical surface at a right angle to the plane of the splitting blade.

17. In a fruit preparation machine, a splitting blade, a coring knife mounted in the plane of said splitting blade, clamp means for supporting and moving a piece of fruit onto the splitting blade into operative relation with said coring knife, means for operating said clamp means and said coring knife seriatim, a stripper for removing split sections of fruit from the splitting blade, means for opening said clamp means after operation of said coring knife, and means operated simultaneously with the operation of said clamp opening means for actuating said stripper.

18. In a pear preparation machine having a fruit support and a fruit coring device, a stop device for freely engaging the butt end of the fruit in flush abutting relation therewith to position the fruit relative to the coring device, a set of clamps for holding the fruit against the stop device, supporting means for moving said stop device and said clamps between said support and said coring device to pick up a piece of fruit from said support and move it into operative relation with respect to said coring device, said stop device being connected to said supporting means for adjusting movement relative to said clamps, and an adjustable stop carried by said supporting means for controlling the fruit engaging position of said stop device relative to said clamps.

19. In a pear preparation machine having a fruit support and a fruit coring device, a stop device for engaging the calyx end of the fruit to control the position of the fruit relative to the coring device, clamp means for holding the fruit against the stop device, supporting means for moving said stop device and said clamp means between said support and said coring device to pick up a piece of fruit from said support and move it into operative relation with respect to said coring device, said stop device being connected to said supporting means for adjusting movement relative to said clamps, adjustable stop means for limiting movement of said supporting means toward said fruit support, and an adjustable stop associated with said supporting means for controlling the fruit engaging position of said stop device relative to said clamps.

20. In a pear preparation machine, a fruit support, a coring device, reciprocable clamp means for transferring fruit from said support into operative relation with said coring device, means mounting said clamp means for movement back and forth between respective cooperative positions relative to said fruit support and said coring device, fruit positioning means cooperatively related to said clamp means for back and forth movement therewith, said fruit positioning means being mounted for movement relative to said clamp means to engage an end of fruit clamped thereby to position and hold the fruit relative to said clamp means, and an adjustable stop associated with said clamp means and cooperable with said positioning means for determining the adjusted position of said positioning means relative to said clamping means, whereby to control the position of the fruit and determine the desired positioning thereof relative to said coring device.

ALBERT R. THOMPSON.